(12) United States Patent
Koo et al.

(10) Patent No.: US 9,870,750 B2
(45) Date of Patent: Jan. 16, 2018

(54) LIQUID CRYSTAL DISPLAY DEVICE

(71) Applicant: SAMSUNG DISPLAY CO., LTD., Yongin-si, Gyeonggi-do (KR)

(72) Inventors: Ja Hun Koo, Asan-si (KR); Hak Sun Kim, Seoul (KR); Su Han Woo, Asan-si (KR); Kyung Hun Lee, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 75 days.

(21) Appl. No.: 15/147,271

(22) Filed: May 5, 2016

(65) Prior Publication Data
US 2017/0110079 A1 Apr. 20, 2017

(30) Foreign Application Priority Data
Oct. 15, 2015 (KR) .................. 10-2015-0144218

(51) Int. Cl.
*G09G 3/36* (2006.01)
*G02F 1/1362* (2006.01)
*G02F 1/1368* (2006.01)
*G02F 1/133* (2006.01)

(52) U.S. Cl.
CPC ......... *G09G 3/3688* (2013.01); *G02F 1/1368* (2013.01); *G02F 1/13306* (2013.01); *G02F 1/136286* (2013.01); *G09G 3/3648* (2013.01); *G09G 3/3677* (2013.01); G09G 2300/0426 (2013.01); G09G 2300/0819 (2013.01); G09G 2300/0876 (2013.01); G09G 2310/061 (2013.01); G09G 2310/08 (2013.01); G09G 2320/0204 (2013.01); G09G 2320/0219 (2013.01); G09G 2320/0247 (2013.01); G09G 2320/0257 (2013.01)

(58) Field of Classification Search
None
See application file for complete search history.

(56) References Cited

U.S. PATENT DOCUMENTS

2003/0098657 A1* 5/2003 Suzuki .................. G09G 3/3233
                                                                315/169.3
2006/0114209 A1   6/2006 Kim et al.
(Continued)

FOREIGN PATENT DOCUMENTS

KR      1020130034154 A    4/2013

*Primary Examiner* — Nicholas Lee
(74) *Attorney, Agent, or Firm* — Cantor Colburn LLP

(57) ABSTRACT

A liquid crystal display device includes a gate driving unit connected to an ith gate line and a first compensation line, a data driving unit connected to a jth data line and a pixel unit including a first switching element including a first electrode connected to the jth data line, a pixel electrode connected to second electrode of the first switching element, and a compensation capacitor including a first electrode connected to the first compensation line and a second electrode connected to the pixel electrode, where the gate driving unit includes a second switching element including a gate electrode connected to an i−1th gate line, a first electrode connected to a reset line, and a second electrode connected to the first compensation line, and a third switching element including a gate electrode connected to an i+1th gate line and a first electrode connected to the first compensation line.

20 Claims, 7 Drawing Sheets

(56) References Cited

U.S. PATENT DOCUMENTS

2007/0164958 A1* 7/2007 Edwards .......... G02F 1/136286
　　　　　　　　　　　　　　　　　　　　　345/92
2016/0049136 A1* 2/2016 Seo ..................... G09G 3/3611
　　　　　　　　　　　　　　　　　　　　　345/213

* cited by examiner (a)

(b)

LIQUID CRYSTAL DISPLAY DEVICE

This application claims priority to Korean Patent Application No. 10-2015-0144218, filed on Oct. 15, 2015, and all the benefits accruing therefrom under 35 U.S.C. §119, the content of which is in its entirety is herein incorporated by reference.

BACKGROUND

1. Field

Exemplary embodiments of the invention relate to a liquid crystal display device.

2. Description of the Related Art

An importance of display devices is increasing along with a development of multimedia. Accordingly, various kinds of display devices such as a liquid crystal display ("LCD") and an organic light emitting display ("OLED") are being used.

An LCD among such display devices is presently one of most widely used flat panel display devices, and generally includes two substrates having electric field generating electrodes such as pixel electrodes and a common electrode formed thereon, and a liquid crystal layer interposed between the substrates. An LCD is configured in that a voltage is applied to the electric field generating electrodes so as to generate an electric field in the liquid crystal layer, which thus determines the orientation of liquid crystal molecules of the liquid crystal layer and controls the polarization of incident light, thereby displaying desired images.

SUMMARY

In a liquid crystal display ("LCD"), when a switching element which applies a data signal to a pixel electrode is switched from a turn-on state to a turn-off state, a voltage applied to the pixel electrode may be reduced by a kickback voltage. That is, the kickback voltage means an amount of change in the voltage in a transition direction, being applied to the pixel electrode influenced by a transition of a gate signal of the switching element when the gate signal is dropped from a high voltage to a low voltage. The kickback voltage may vary depending on the polarity (positive polarity or negative polarity) of the data signal, and may lower the overall driving voltage of an LCD device. Furthermore, since the kickback voltage may vary at each point of a display panel, defects such as flicker, afterimage or moving vertical stripes may occur.

An exemplary embodiment of the invention provides an LCD device in which a kickback voltage is compensated for.

Another exemplary embodiment of the invention provides an LCD device in which a kickback voltage is compensated for so as to improve flicker, afterimage and moving vertical stripes.

According to an exemplary embodiment of the invention, a kickback voltage is compensated for so as to maintain the kickback voltage constant throughout a display panel.

Furthermore, the compensation of the kickback voltage may improve flicker, afterimage and moving vertical stripes.

An exemplary embodiment of the invention discloses an LCD device including a gate driving unit connected to an ith gate line and a first compensation line, a data driving unit connected to a jth data and a pixel unit including a first switching element including a gate electrode connected to the ith gate line and a first electrode connected to the jth data line, a pixel electrode connected to a second electrode of the first switching element, and a compensation capacitor including a first electrode connected to the first compensation line and a second electrode connected to the pixel electrode, where the gate driving unit includes a second switching element including a gate electrode connected to an i−1th gate line, a first electrode connected to a reset line, and a second electrode connected to the first compensation line, and a third switching element including a gate electrode connected to an i+1th gate line and a first electrode connected to the first compensation line.

An exemplary embodiment of the invention also disclose an LCD device including a gate driving unit connected to an ith gate line and a first compensation line, a data driving unit connected to a jth data line and a pixel unit including a first switching element including a gate electrode connected to the ith gate line and a first electrode connected to the jth data line, a pixel electrode connected to the second electrode of the first switching element, and a compensation capacitor including a first electrode connected to the first compensation line and a second electrode connected to the pixel electrode, where the first compensation line is provided with a reset signal during a reset period before the first switching element is turned on, and provided with a boost-up signal during a boost-up period after the first switching element is turned off.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
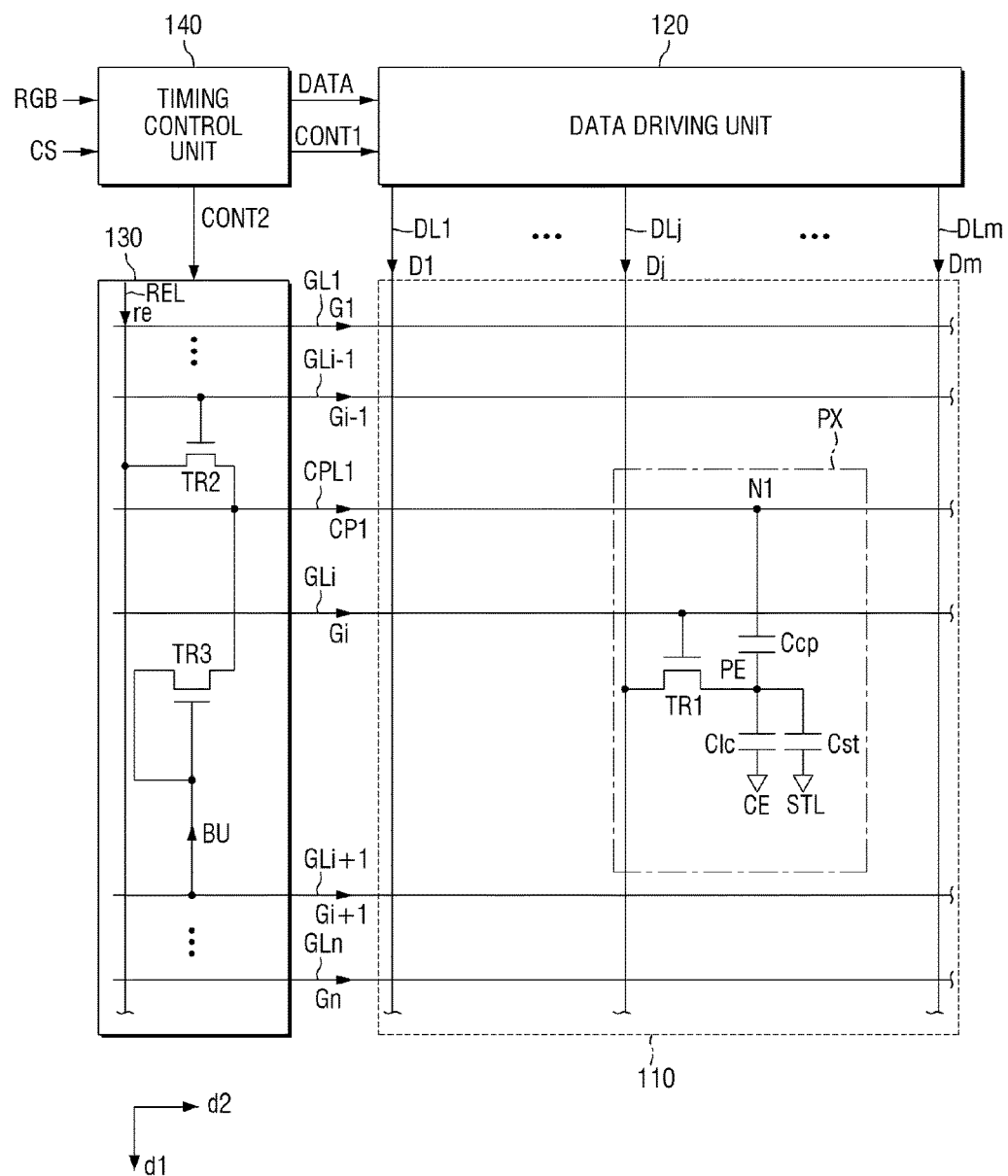
FIG. 1 is a block diagram illustrating an exemplary embodiment of a liquid crystal display ("LCD") device according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this invention, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the invention.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In an exemplary embodiment, an implanted region illustrated as a rectangle will, typically, have rounded or curved features and/or a gradient of implant concentration at its edges rather than a binary change from implanted to non-implanted region, for example. Likewise, a buried region provided by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a block diagram illustrating a liquid crystal display ("LCD") device according to an exemplary embodiment of the invention.

Referring to FIG. 1, an LCD device according to an exemplary embodiment of the invention may include a display panel 110, a data driving unit 120, a gate driving unit 130 and a timing control unit 140.

The display panel 110 displays an image. The display panel 110 may include a lower display plate, an upper display plate facing the lower display plate, and a liquid crystal layer interposed therebetween. That is, the display panel 110 may be a liquid crystal panel. The display panel 110 may be connected to a plurality of gate lines GL1 to GLn (where n is a natural number equal to or larger than 1) and a plurality of data lines DL1 to DLm (where m is a natural number equal to or larger than 1). In addition, the display panel 110 may include a pixel unit PX connected to ith gate line GLi among the plurality of gate lines GL1 to GLn and jth data line DLj among the plurality of data lines DL1 to DLm. As one exemplary embodiment, the plurality of data lines DL1 to DLm may extend in a first direction d1 on the lower display plate. The plurality of gate lines GL1 to GLn may extend in a second direction d2 intersecting the first direction d1. The first direction d1 and the second direction d2 may vertically intersect each other. FIG. 1 illustrates an example in which the first direction d1 is a row direction and the second direction d2 is a column direction.

The pixel unit PX may receive jth data signal Dj from jth data line DLj in response to ith gate signal Gi provided from ith gate line GLi. More specifically, the pixel unit PX may include a first switching element TR1, a pixel electrode PE and a compensation capacitor Ccp.

As one exemplary embodiment, the first switching element TR1 may be a tri-terminal element. The first switching element TR1 may include a gate electrode connected to the ith gate line GLi, a first electrode connected to the jth data line DLj and a second electrode connected to the pixel electrode PE. It will hereinafter be assumed that a first electrode of the first switching element TR1 is a drain electrode and the second electrode of the first switching element TR1 is a source electrode.

The first switching element TR1 may be turned on in response to an ith gate signal Gi provided from the ith gate line GLi so as to provide a jth data signal Dj provided from the jth data line DLj to the pixel electrode PE.

The pixel unit PX may further include a liquid crystal capacitor Clc1 provided between the pixel electrode PE to which the jth data signal Dj is applied and a common electrode CE to which a common voltage Vcom (refer to FIG. 3) is applied. The liquid crystal capacitor Clc1 may be charged with a voltage difference between the voltage applied to the pixel electrode PE and the common voltage Vcom.

The compensation capacitor Ccp includes a first electrode connected to the pixel electrode PE and the second electrode connected to a first compensation line CPL1 at a first node N1. As one exemplary embodiment, the first compensation line CPL1 may extend in the direction same as that of the ith gate line GLi, that is, in the second direction d2. The first compensation line CPL1 may be connected to the gate driving unit 130 so as to receive a reset signal re during a reset period RE (refer to FIG. 3) and a boost-up signal BU during a boost-up period Boost-up (refer to FIG. 3). The first compensation line CPL1 may receive the first compensation signal CP1 except during the reset period RE and the boost-up period Boost-up. This will be described later with reference to FIGS. 2 and 3.

The pixel unit PX may further include a storage capacitor Cst provided between the pixel electrode PE and a storage line STL. The storage capacitor Cst may be charged with the difference between a voltage level of a signal provided from the storage line STL and a voltage level of a signal applied to the pixel electrode PE.

As one exemplary embodiment, the data driving unit 120 may include a shift register, a latch, a digital-analog converter unit DAC and the like. The data driving unit 120 may receive a first control signal CONT1 and image data DATA from the timing control unit 140. The data driving unit 120 may select a reference voltage in response to the first control signal CONT1, and convert the input image data DATA of a digital waveform into a plurality of data signals D1 to Dm according to the selected reference voltage. The data driving circuit 120 may provide the generated plurality of data signals D1 to Dm to the display panel 110.

The gate driving circuit 130 may receive a second control signal CONT2 from the timing control unit 140. The gate driving circuit 130 may provide the plurality of gate signals G1 to Gn to the display panel 110 according to the received second control signal CONT2.

The gate driving unit 130 may be connected to the pixel unit PX through the first compensation line CPL1. Descriptions are made herein with respect to the first compensation line CPL1 connected to the pixel unit PX, but the invention is not limited thereto. That is, the gate driving unit 130 may be connected to each of a plurality of other pixel units through a plurality of compensation lines when the display panel 110 further includes the plurality of other pixel units in addition to the pixel unit PX. Alternatively, the gate driving unit 130 may be connected to a part of the plurality of other pixel units through a compensation line.

The gate driving unit 130 may further include a second switching element TR2 connected to the first compensation line CPL1 and a reset line REL connected to a first electrode of the second switching element TR2. As one exemplary embodiment, the second switching element TR2 may be a tri-terminal element. The second switching element TR2 may include a gate electrode connected to an i−1th gate line GLi−1 and a first electrode connected to the reset line REL. Furthermore, the second switching element TR2 may include a second electrode connected to the first compensation line CPL1.

The i−1th gate line GLi−1 may apply a gate signal to the display panel 110 relatively earlier than the ith gate line GLi among the gate lines neighboring the ith gate line GLi. The expression "the i−1th gate line and the ith gate line neighbor" as used herein may mean that a separate gate line may not be interposed between the i−1th gate line and the ith gate line. That is, the second switching element TR2 may provide the reset signal re provided from the reset line REL to the first compensation line CPL1 during the reset period RE where the second switching element TR2 is turned on in response to an i−1th gate signal Gi−1 provided from the i−1th gate line GLi−1 neighboring the ith gate line GLi.

The gate driving unit 130 may further include a third switching element TR3. As one exemplary embodiment, the third switching element TR3 may be a tri-terminal element. The third switching element TR3 may include a gate electrode connected to an i+1th gate line GLi+1 and a first electrode connected to the first compensation line CPL1. Furthermore, the third switching element TR3 may include a second electrode connected to the gate electrode of the third switching element TR3. That is, the third switching element TR3 may be a diode-connected switching element.

Thus, the third switching element TR3 may provide an i+1th gate signal Gi+1 to the first compensation line CPL1 during the boost-up period Boost-up where the third switching element TR3 is turned on in response to the i+1th gate signal Gi+1 provided from the i+1th gate line GLi+1. That is, the boost-up signal BU may be the i+1th gate signal Gi+1. Switching operation of the first to third switching elements TR1 to TR3 and a voltage level transition in the pixel electrode PE will be described later with reference to FIGS. 2 and 3.

The timing control unit 140 may receive, as an input, image signals R, G and B and a control signal thereof CS from an external source. As one exemplary embodiment, the control signal CS may include a vertical synchronous signal, a horizontal synchronous signal, a main clock signal, a data enable signal and the like. The timing control unit 140 may process signals provided from an external source such that the signals are suitable for an operation condition of the display panel 110, and then generate the image data DATA, the first control signal CONT1 and the second control signal CONT2. The first control signal CONT1 may include a horizontal synchronization start signal for instructing start of an input of the image data DATA, a load signal for controlling an application of the plurality of data signals D1 to Dm to the plurality of data lines DL1 to DLm, and the like. The second control signal CONT2 may include a scan start signal for instructing start of an output of the plurality of gate signals G1 to Gn, a gate clock signal for controlling the output timing of a scan-on-pulse, and the like.

Figure 2:
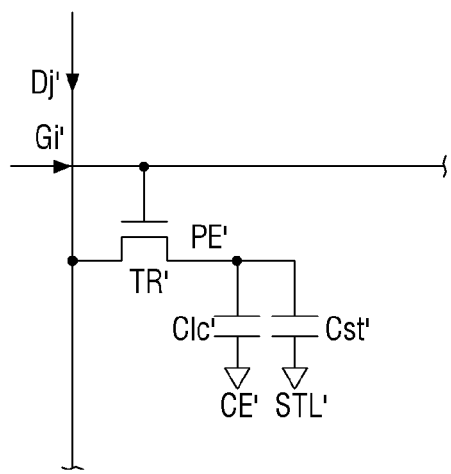
FIG. 2 is a graphical representation illustrating a voltage level transition of a pixel electrode based on a kickback voltage in an LCD device according to conventional techniques.
Figure 2:
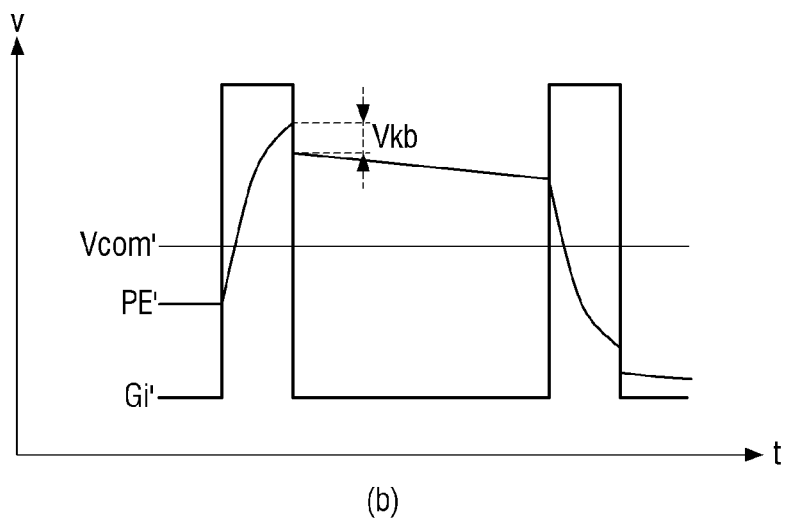
Figure 3:
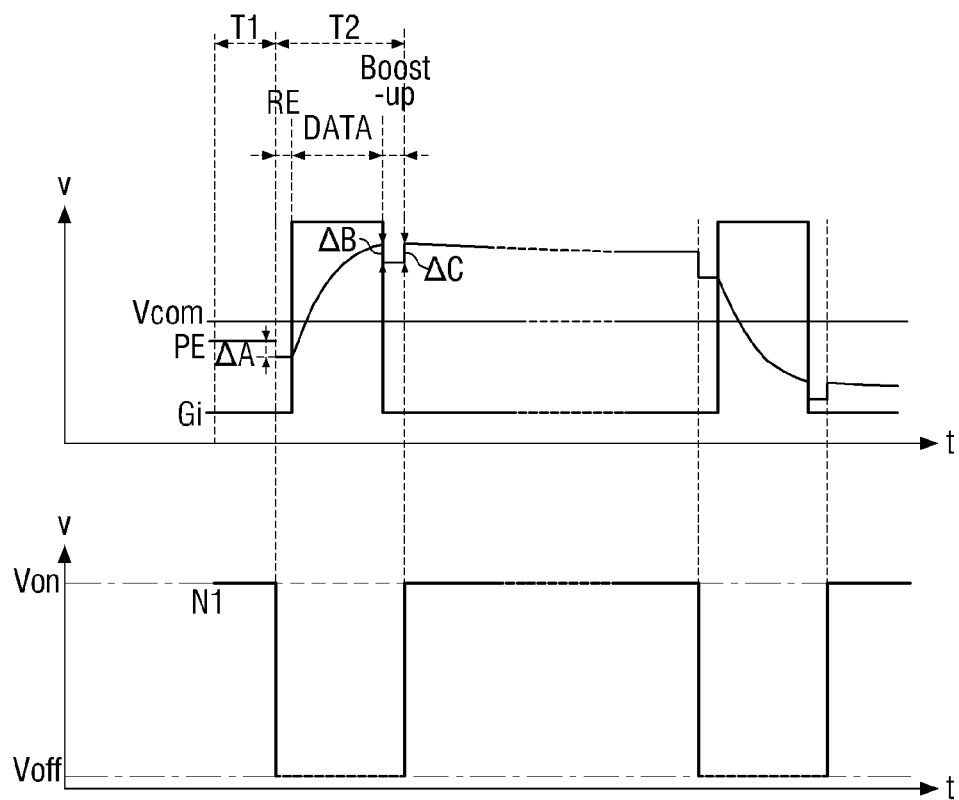
FIG. 3 is a graphical representation illustrating an exemplary embodiment of a method for driving the LCD device according to the invention.

FIG. 2 is a graphical representation illustrating a voltage level transition of a pixel electrode based on a kickback voltage in an LCD device according to conventional techniques. FIG. 3 is a graphical representation illustrating a method for driving the LCD device according to an exemplary embodiment of the invention. The data signals are depicted in FIGS. 2 and 3 as having positive (+) polarity.

Referring to FIGS. 2(a) and (b), a switching element TR' may receive a high level ith gate signal Gi' so as to be turned on. Thus, a voltage level in a pixel electrode PE' may be raised when a jth data signal Dj' is applied thereto. Then, when the high level ith gate signal Gi' makes a transition to a low level, the voltage applied to the pixel electrode PE' may change in the transition direction by being influenced by the transition of the ith gate signal Gi'. The amount of change herein is referred to as a kickback voltage Vkb. The kickback voltage Vkb may cause a parasitic capacitor component between a gate electrode and a source electrode of the switching element TR', and may be expressed in the equation as follows:

$$\Delta Vkb = (Cgs/(Cgs+Clc'+Cst'))*\Delta Vgs(Von-Voff) \quad \text{[Equation]}$$

In the equation above, Cgs indicates a capacity of a parasitic capacitor between a gate electrode and a source electrode of the switching element TR', and Clc' may indicate a capacity of a liquid crystal capacitor. In addition, Cst' indicates a capacity of a storage capacitor, and $\Delta$ Vgs means a voltage difference between a signal applied to the gate electrode of the switching element TR' and a signal applied to the source electrode of the switching element TR'.

The kickback voltage Vkb may vary depending on the polarity of the data signal Dj' and may also vary at each point of a display panel. Thus, defects such as afterimage, flicker or moving vertical stripes may occur.

Referring to FIGS. 1 and 3, a period may be divided into a first period T1 in which the voltage level of the pixel electrode PE does not substantially change and a second period T2 in which the voltage level of the pixel electrode PE changes.

In the first period T1, a first compensation signal CP1 may be applied to the first compensation line CPL1. The first compensation signal CP1 may have a voltage level Von. Thus, the first node N1 may have a voltage level maintained at Von.

The second period T2 may include a reset period RE, a data period DATA and a boost-up period Boost-up.

First, a reset signal re may be applied to the first compensation line CPL1. More specifically, the second switching element TR2 may receive the i−1th gate signal Gi−1 in the reset period RE so as to be turned on and apply the reset signal re provided from the reset line REL to the first compensation line CPL1. The reset signal re may have a voltage level Voff which is lower than a voltage level Von of the first compensation signal CP1. Thus, the voltage level of the first node N1 may be dropped from Von to Voff.

Resultantly, the voltage level of the pixel electrode PE may be lowered by a coupling phenomenon as the reset signal re is applied to cause the voltage level of the first node N1 to be dropped from Von to Voff. The amount of change in the voltage level of the pixel electrode PE may be designated by $\Delta$ A.

Then, as the high level ith gate signal Gi may be applied to the first switching element TR1 during the data period DATA, the first switching element TR1 may be turned on. Thus, the jth data signal Dj may be applied to the pixel electrode PE. The jth data signal Dj may be provided to the pixel electrode PE during the data period DATA, thereby raising the voltage level of the pixel electrode PE. The voltage level of the first node N1 may be maintained at Voff.

Then, the period may be switched to the boost-up period Boost-up, the boost-up signal BU may be applied to the first compensation line CPL1.

More specifically, first, as the high level ith gate signal Gi makes a transition to a low level, the first switching element TR1 may be turned off. In this case, the voltage level of the pixel electrode PE may be lowered due to the parasitic capacitor component provided between the gate electrode and the source electrode of the first switching element TR1.

The amount of change in the voltage level of the pixel electrode PE may be designated by $\Delta$ B, and $\Delta$ A may be substantially the same as or similar to $\Delta$ B. In this case, the amount of change $\Delta$ B in the voltage level of the pixel electrode PE may ultimately mean the kickback voltage Vkb.

Then, the third switching element TR3 may receive the i+1th gate signal Gi+1 from the i+1th gate line GLi+1 so as to be turned on and provide the boost-up signal BU to the first compensation line CPL1. As one exemplary embodiment, the boost-up signal BU may be the i+1th gate signal Gi+1, and the voltage level may be Von. Thus, the voltage level of the first node N1 may rise again from Voff to Von. The compensation capacitor Ccp may be charged with the voltage difference between the voltage applied to the first node N1 and the voltage applied to the pixel electrode PE.

Thus, the voltage level of the pixel electrode PE may rise by a coupling phenomenon as the boost-up signal BU is applied to cause the voltage level of the first node N1 to rise from Voff to Von. In this case, the amount of change in the voltage level of the pixel electrode PE may be designated by $\Delta$ C, where $\Delta$ C may be substantially the same as or similar to $\Delta$ B.

That is, the amount of change $\Delta$ C in the voltage level of the pixel electrode PE may be substantially the same as or similar to the amount of change $\Delta$ B in the voltage level of the pixel electrode PE, where the amount of change $\Delta$ B means the kickback voltage Vkb. This ultimately may mean that the voltage level of the pixel electrode PE lowered by the kickback voltage Vkb is compensated for during the boost-up period Boost-up.

The reset signal re is applied to the first node N1 before the data signal Dj is applied to the pixel electrode PE, and the boost-up signal BU is applied to the first node N1 after the application of the data signal Dj, thereby compensating for the kickback voltage Vkb.

Thus, an overall driving voltage of an LCD device may be prevented from being lowered, and defects such as flicker, afterimage or moving vertical stripes may be prevented.

Although the gate electrode of the second switching element TR2 is depicted as being connected to the i−1th gate line GLi−1 in FIG. 1, the invention is not limited thereto. That is, the invention is not limited to the i−1th gate line GLi−1 to which the gate electrode of the second switching element TR2 is connected, and the gate electrode of the second switching element TR2 may be connected to any gate line that provides a gate signal to the display panel 110 relatively earlier than the ith gate line Gi.

Furthermore, although the gate electrode of the third switching element TR3 is depicted as being connected to the i+1th gate line GLi+1 in FIG. 1, the invention is not limited thereto. That is, the invention is not limited to the i+1th gate line GLi+1 to which the gate electrode of the third switching element TR3 is connected, and the gate electrode of the third switching element TR3 may be connected to any gate line that provides a gate signal to the display panel 110 relatively later than the ith gate line Gi.

Figure 4:
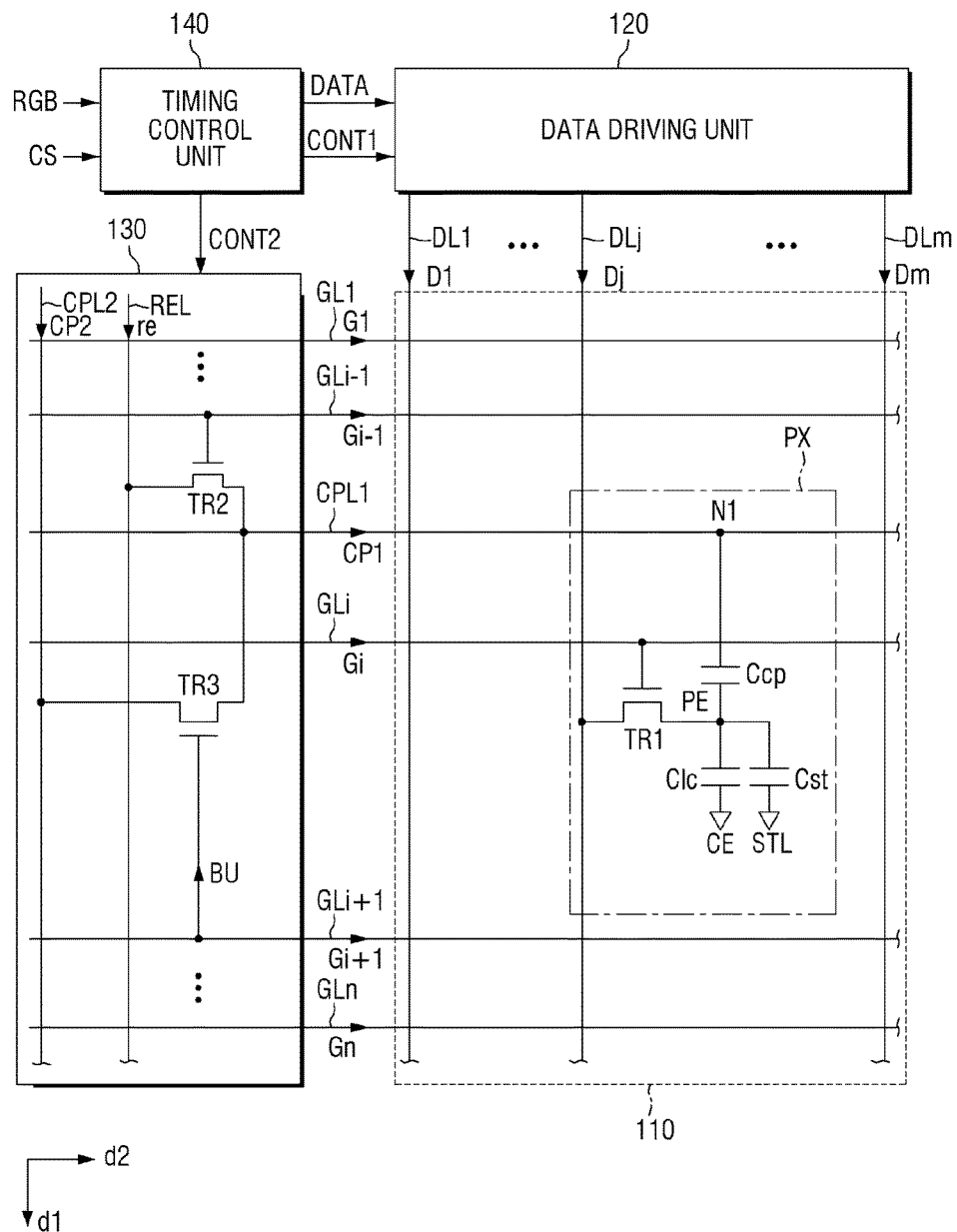
FIG. 4 is a block diagram illustrating another exemplary embodiment of an LCD device according to the invention.

FIG. 4 is a block diagram illustrating an LCD device according to another exemplary embodiment of the invention. Hereinafter, duplicate descriptions of components corresponding to those described with reference to FIG. 1 to FIG. 3 will be omitted.

The gate driving unit 130 may further include a second compensation line CPL2. The gate electrode of the third switching element TR3 may be connected to the i+1th gate line GLi+1 and a first electrode of the third switching element TR 3 may be connected to the first compensation line CPL1. A second electrode of the third switching element TR3 may be connected to the second compensation line CPL2. That is, the third switching element TR3 may receive the i+1th gate line GLi+1 so as to be turned on and apply a second compensation signal CP2 to the first compensation line CPL1. In this case, the second compensation signal CP2 may have a voltage level Von. That is, the voltage level of the second compensation signal CP2 may be substantially the same as or similar to the voltage level of the i+1th gate signal Gi+1.

That is, the LCD device according to another exemplary embodiment of the invention may include the separate second compensation line CPL2, and thus a first electrode of the third switching element TR3 may be connected to the second compensation line CPL2 rather than the gate electrode of the third switching element TR3.

Although the second compensation line CPL2 is depicted as being disposed in the gate driving unit 130 in FIG. 4, the invention is not limited thereto. That is, the second compensation line CPL2 may be connected to other integrated circuits ("ICs") than the gate driving unit 130.

Figure 5:
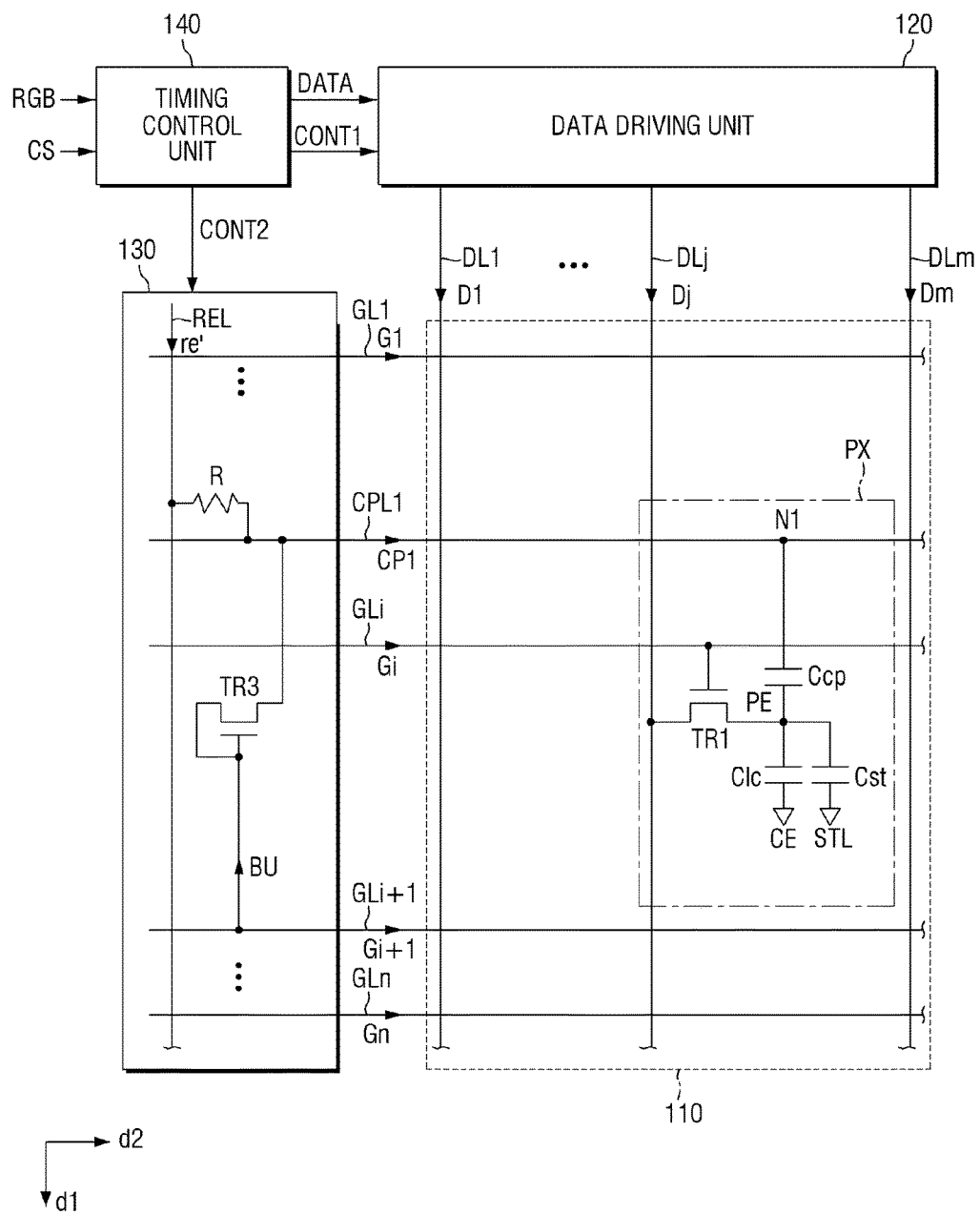
FIG. 5 is a block diagram illustrating another exemplary embodiment of an LCD device according to the invention.
Figure 6:
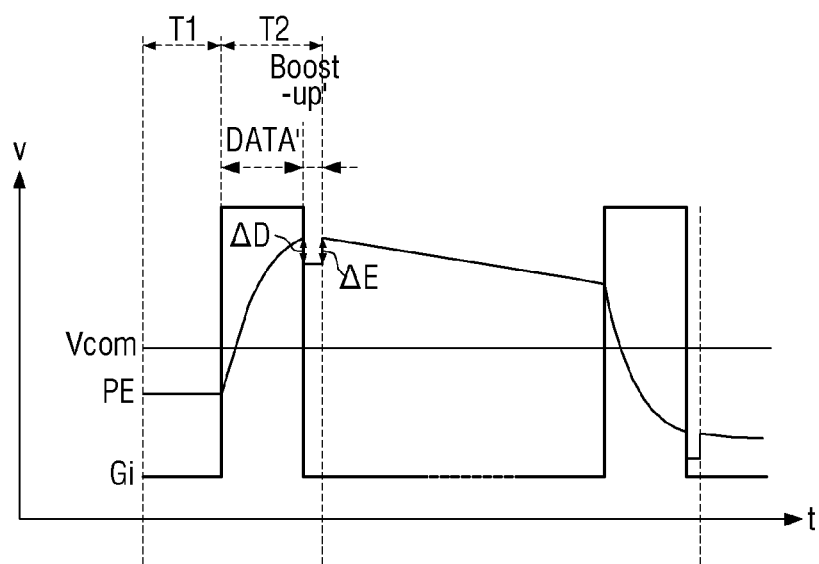
FIG. 6 is a graphical representation illustrating another exemplary embodiment of a method for driving the LCD device shown in FIG. 5 according to the invention.

FIG. 5 is a block diagram illustrating an LCD device according to another exemplary embodiment of the invention. FIG. 6 is a graphical representation illustrating a method for driving the LCD device shown in FIG. 5 according to another exemplary embodiment of the invention.

Referring first to FIG. 5, the LCD device according to another exemplary embodiment of the invention may further include a resistor element R connected between the reset line REL and the first compensation line CPL1. That is, the gate driving unit 130 may not include the second switching element TR2.

Although only one resistor element R is depicted in FIG. 5, the invention is not limited thereto and the number of resistor elements and a connection relationship may vary. However, the resistor element R may have a resistance value enabling the compensation capacitor Ccp to be discharged by the amount of change Δ E in the voltage level of the pixel electrode PE shown in FIG. 6 in one frame.

Referring to FIG. 6, a period may be divided into a third period T3 in which the voltage level of the pixel electrode PE does not substantially change and a fourth period T4 in which the voltage level of the pixel electrode PE changes.

In the third period T3, the first compensation signal CP1 may be applied to the first compensation line CPL1. The first compensation signal CP1 may have a voltage level Von. A reset signal re' which is voltage-dropped through the resistor element R may be applied to the first compensation signal CP1 from the reset line REL. Thus, a signal having a voltage level lower than voltage level Von may be applied to the first node N1. Thus, the voltage level of the pixel electrode PE may be lower than the voltage level of the pixel electrode PE in the first period T1 shown in FIG. 3.

The fourth period T4 may include a data period DATA' and a boost-up period Boost-up'.

In the data period DATA', the high level ith gate signal Gi may be applied to the first switching element TR1 so as to turn on the first switching element TR1. Thus, the jth data signal Dj may be applied to the pixel electrode PE. Since the pixel electrode PE may be provided with the jth data signal Dj during the data period DATA', the voltage level of the pixel electrode PE may rise.

Then, the period is switched to the boost-up period Boost-up', and the boost-up signal BU may be applied to the first compensation line CPL1.

More specifically, first, as the high level ith gate signal Gi makes a transition to a low level, the first switching element TR1 may be turned off. In this case, the voltage level of the pixel electrode PE may be lowered due to the parasitic capacitor component provided between the gate electrode and the source electrode of the first switching element TR1. The amount of change in the voltage level of the pixel electrode PE may be designated by Δ D. In this case, the amount of change Δ D in the voltage level of the pixel electrode PE may ultimately mean the kickback voltage Vkb.

Then, the third switching element TR3 may receive the i+1th gate signal Gi+1 from the i+1th gate line GLi+1 so as to be turned on and provide the boost-up signal BU to the first compensation line CPL1. As one exemplary embodiment, the boost-up signal BU may be the i+1th gate signal Gi+1, and the voltage level may be Von. Thus, the voltage level of the first node N1 may rise again to Von. The compensation capacitor Ccp may be charged with the voltage difference between the voltage applied to the first node N1 and the voltage applied to the pixel electrode PE.

Thus, the voltage level of the pixel electrode PE may rise by a coupling phenomenon as the boost-up signal BU is applied to cause the voltage level of the first node N1 to rise to Von. In this case, the amount of change in the voltage level of the pixel electrode PE may be designated by Δ E, where Δ E may be substantially the same as or similar to Δ D.

That is, the amount of change Δ E in the voltage level of the pixel electrode PE may be substantially the same as or similar to the amount of change Δ D in the voltage level of the pixel electrode PE, where the amount of change Δ D means the kickback voltage Vkb. This ultimately may mean that the voltage level of the pixel electrode PE lowered by the kickback voltage Vkb is compensated for during the boost-up period Boost-up.

Thus, in the LCD device without a separate second switching element TR2 according to another exemplary embodiment of the invention, the kickback voltage Vkb may be compensated for by using the resistor element R. Thus, an overall driving voltage of an LCD device may be prevented from being lowered, and defects such as flicker, afterimage or moving vertical stripes may be prevented.

Figure 7:
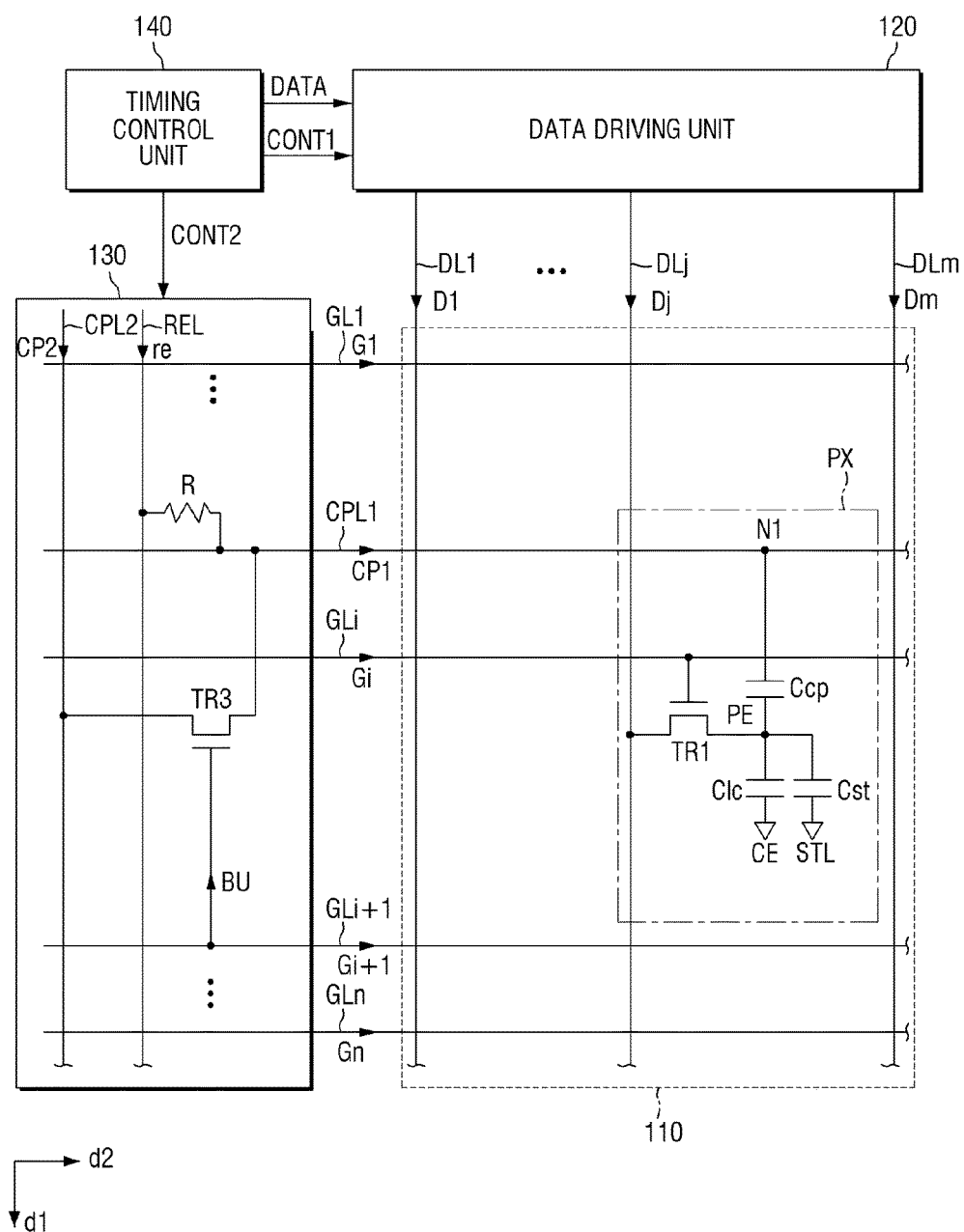
FIG. 7 is a block diagram illustrating another exemplary embodiment of an LCD device according to the invention.

FIG. 7 is a block diagram illustrating an LCD device according to another exemplary embodiment of the invention. Hereinafter, duplicate descriptions of components corresponding to those described with reference to FIGS. 1 to 3 and 6 will be omitted.

The gate driving unit 130 may further include the second compensation line CPL2. The gate electrode of the third switching element TR3 may be connected to the i+1th gate line GLi+1 and a first electrode of the third switching element TR 3 may be connected to the first compensation line CPL1. A second electrode of the third switching element TR3 may be connected to the second compensation line CPL2. That is, the third switching element TR3 may receive the i+1th gate line GLi+1 so as to be turned on and apply the second compensation signal CP2 to the first compensation line CPL1. In this case, the second compensation signal CP2 may have a voltage level Von. That is, the voltage level of the second compensation signal CP2 may be substantially the same as or similar to the voltage level of the i+1th gate signal Gi+1.

That is, the LCD device according to another exemplary embodiment of the invention may include the separate second compensation line CPL2, and thus a first electrode of the third switching element TR3 may be connected to the second compensation line CPL2 rather than the gate electrode of the third switching element TR3.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display device comprising:
    a gate driving unit connected to an ith gate line and a first compensation line;
    a data driving unit connected to a jth data line; and
    a pixel unit including a first switching element including a gate electrode connected to the ith gate line and a first electrode connected to the jth data line, a pixel electrode connected to a second electrode of the first switching element, and a compensation capacitor including a first electrode connected to the first compensation line and a second electrode connected to the pixel electrode,
    wherein the gate driving unit includes a second switching element including a gate electrode connected to an i−1th gate line, a first electrode connected to a reset line, and a second electrode connected to the first compensation line, and a third switching element including a gate electrode connected to an i+1th gate line and a first electrode connected to the first compensation line.

2. The liquid crystal display device of claim 1, wherein the second switching element provides a reset signal provided from the reset line during a reset period where the second switching element is turned on, to the first electrode of the compensation capacitor.

3. The liquid crystal display device of claim 1, wherein a voltage level of the pixel electrode is lowered by a kickback voltage defined as a voltage charged in a parasitic capacitor interposed between the gate electrode and the second electrode of the first switching element during a first compensation period, and the voltage level of the pixel electrode is raised by a compensation voltage defined as a voltage charged in the compensation capacitor during a second compensation period which follows the first compensation period.

4. The liquid crystal display device of claim 3, wherein the compensation voltage has a level same as a level of the kickback voltage.

5. The liquid crystal display device of claim 3, wherein the third switching element is turned on during the second compensation period so as to provide an i+1th gate signal provided from the i+1th gate line to the first compensation line.

6. The liquid crystal display device of claim 1, wherein the gate electrode of the third switching element is connected to a second electrode of the third switching element.

7. The liquid crystal display device of claim 1, wherein the gate driving unit further includes a second compensation line connected to a second electrode of the third switching element.

8. The liquid crystal display device of claim 7, wherein a level of a signal applied from the second compensation line is the same as a level of an i+1th gate signal provided from the i+1th gate line.

9. The liquid crystal display device of claim 1, wherein the first compensation line is disposed in a direction same as directions of the i−1th gate line, the ith gate line and the i+1th gate line.

10. A liquid crystal display device comprising:
    a gate driving unit connected to an ith gate line and a first compensation line;
    a data driving unit connected to a jth data line; and
    a pixel unit including a first switching element including a gate electrode connected to the ith gate line and a first electrode connected to the jth data line, a pixel electrode connected to a second electrode of the first switching element, and a compensation capacitor including a first electrode connected to the first compensation line and a second electrode connected to the pixel electrode,
    wherein the first compensation line is provided with a reset signal during a reset period before the first switching element is turned on, and provided with a boost-up signal during a boost-up period after the first switching element is turned off.

11. The liquid crystal display device of claim 10, wherein a voltage level of the pixel electrode is lowered by a kickback voltage defined as a voltage charged in a parasitic capacitor interposed between the gate electrode and the second electrode of the first switching element during the reset period.

12. The liquid crystal display device of claim 10, wherein a voltage level of the pixel electrode is raised by a kickback voltage defined as a voltage charged in a parasitic capacitor interposed between the gate electrode and the second electrode of the first switching element during the boost-up period.

13. The liquid crystal display device of claim 10, wherein the gate driving unit includes: a second switching element including a gate electrode connected to an i−1th gate line neighboring the ith gate line, a first electrode connected to a reset line providing the reset signal, and a second electrode connected to the first compensation line; and a third switching element including a gate electrode connected to an i+1th gate line neighboring the ith gate line and a first electrode connected to the first compensation line.

14. The liquid crystal display device of claim 13, wherein a second electrode of the third switching element is connected to the gate electrode of the third switching element.

15. The liquid crystal display device of claim 13, wherein the second switching element provides the reset signal provided from the reset line during the reset period to the first electrode of the compensation capacitor.

16. The liquid crystal display device of claim 13, wherein the third switching element is turned on during the boost-up period so as to provide an i+1th gate signal provided from the i+1th gate line to the first compensation line.

17. The liquid crystal display device of claim 13, wherein the gate driving unit further includes a second compensation line connected to a second electrode of the third switching element, and a level of a signal applied from the second compensation line is the same as a level of an i+1th gate signal provided from the i+1th gate line.

18. The liquid crystal display device of claim 10, wherein the gate driving unit further includes: a reset line which provides the reset signal; and a resistor element connected between the reset line and the first compensation line.

19. The liquid crystal display device of claim 18, wherein the gate driving unit includes a fourth switching element including a gate electrode connected to an i+1th gate line neighboring the ith gate line and a first electrode connected to the first compensation line.

20. The liquid crystal display device of claim 19, wherein the gate driving unit further includes a second compensation line connected to a second electrode of the fourth switching element, and a level of a signal applied from the second compensation line is the same as a level of an i+1th gate signal provided from the i+1th gate line.

* * * * *